US011279427B2

(12) United States Patent
Murasawa et al.

(10) Patent No.: US 11,279,427 B2
(45) Date of Patent: Mar. 22, 2022

(54) SADDLE-TYPE VEHICLE

(71) Applicant: HONDA MOTOR CO., LTD., Tokyo (JP)

(72) Inventors: Naoki Murasawa, Wako (JP); Kazuhiko Mori, Wako (JP); Kiyoshi Katagiri, Wako (JP); Taishi Inoue, Wako (JP); Manabu Ichikawa, Wako (JP); Tsuyoshi Oguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 472 days.

(21) Appl. No.: 16/319,494

(22) PCT Filed: Aug. 29, 2017

(86) PCT No.: PCT/JP2017/030937
§ 371 (c)(1),
(2) Date: Jan. 22, 2019

(87) PCT Pub. No.: WO2018/043485
PCT Pub. Date: Mar. 8, 2018

(65) Prior Publication Data
US 2021/0276651 A1 Sep. 9, 2021

(30) Foreign Application Priority Data

Aug. 31, 2016 (JP) .............................. JP2016-169790

(51) Int. Cl.
*B62J 6/02* (2020.01)
*F21S 43/14* (2018.01)
(Continued)

(52) U.S. Cl.
CPC .............. *B62J 6/02* (2013.01); *B60Q 1/0023* (2013.01); *B60Q 1/04* (2013.01); *F21S 43/14* (2018.01)

(58) Field of Classification Search
CPC ........... B62J 6/02; F21S 43/14; B60Q 1/0023; B60Q 1/04
(Continued)

(56) References Cited

U.S. PATENT DOCUMENTS 4,967,319 A * 10/1990 Seko .................... B60Q 1/0023
362/420
6,509,832 B1 * 1/2003 Bauer ..................... B63B 45/00
340/425.5
(Continued)

FOREIGN PATENT DOCUMENTS

| CN | 1517260 | 8/2004 |
| CN | 102844616 | 12/2012 |

(Continued)

OTHER PUBLICATIONS

Chinese Office Action for Chinese Patent Application No. 201780049905.X dated Dec. 26, 2019.
(Continued)

*Primary Examiner* — Bryon T Gyllstrom
(74) *Attorney, Agent, or Firm* — Amin, Turocy & Watson, LLP

(57) ABSTRACT

A saddle riding vehicle includes a light emitting device (15, 23), an object information acquisition device (17, 26), a control board (20) and an accommodating case (14). The light emitting device (15, 23) radiates light to an outer side of the vehicle, and the object information acquisition device (17, 26) acquires information of an object outside the vehicle. The control board (20), to which the light emitting device (15, 23) is attached, controls the light emitting device. The accommodating case (14) accommodates the light emitting device (20), the object information acquisition (Continued)

device (17, 26), and the control board (20). The object information acquisition device (17, 26) is supported by the control board (20).

4 Claims, 6 Drawing Sheets

(51) Int. Cl.
  *B60Q 1/00* (2006.01)
  *B60Q 1/04* (2006.01)
(58) Field of Classification Search
  USPC ........................................................ 362/475
  See application file for complete search history.

(56) References Cited

U.S. PATENT DOCUMENTS

| | | | | |
|---|---|---|---|---|
| 2002/0075691 | A1* | 6/2002 | Couillaud | B60Q 1/0023 362/465 |
| 2008/0029701 | A1* | 2/2008 | Onozawa | G01S 7/499 250/332 |
| 2009/0295906 | A1 | 12/2009 | Kushimoto et al. | |
| 2013/0272013 | A1* | 10/2013 | Tatara | B60Q 1/0005 362/546 |
| 2017/0113599 | A1* | 4/2017 | Park | B60Q 1/085 |

FOREIGN PATENT DOCUMENTS

| | | |
|---|---|---|
| CN | 104029628 | 9/2014 |
| CN | 204077909 | 1/2015 |
| CN | 204137192 | 2/2015 |
| CN | 204383647 | 6/2015 |
| CN | 105314012 | 2/2016 |
| DE | 29817058 | 12/1998 |
| DE | 102013218706 | 11/2014 |
| EP | 1515293 | 3/2005 |
| JP | 2001-158284 | 6/2001 |
| JP | 2009-286234 | 12/2009 |
| JP | 2011-184030 | 9/2011 |
| JP | 2012-162228 | 8/2012 |
| JP | 2014-007106 | 1/2014 |
| JP | 2015-123840 | 7/2015 |
| JP | 2017-081222 | 5/2017 |
| WO | 01/98708 | 12/2001 |
| WO | 2014/180856 | 11/2014 |
| WO | 2016/059814 | 4/2016 |
| WO | 2016/131104 | 8/2016 |

OTHER PUBLICATIONS

International Search Report and Written Opinion for International Application No. PCT/JP2017/030937 dated Oct. 17, 2017, 8 pgs.
Extended European Search Report for European Patent Application No. 17846490.5 dated Jun. 7, 2019.
Japanese Office Action for Japanese Patent Application No. 2018-537296 dated Oct. 23, 2019.

* cited by examiner

SADDLE-TYPE VEHICLE

TECHNICAL FIELD

The present invention relates to a saddle riding vehicle including a light emitting device configured to radiate light outside of a vehicle, and an object information acquisition device such as an imaging device or the like configured to acquire information of an object outside the vehicle.

Priority is claimed on Japanese Patent Application No. 2016-169790, filed Aug. 31, 2016, the content of which is incorporated herein by reference.

BACKGROUND ART

In recent years, a vehicle provided with an object information acquisition device such as an imaging device or the like has been developed for the purpose of visual recognition assistance for a driver, recording of a traveling situation, or the like (for example, see Patent Literature 1).

A vehicle disclosed in Patent Literature 1 is a four-wheeled vehicle having a cabin which an occupant boards and a bumper provided at a front section of the vehicle, and an imaging device and a light emitting device are attached to a portion of the bumper. The imaging device and the light emitting device are assembled side by side in an accommodating case that opens forward, and a front surface side of the accommodating case is closed by a transparent plate member.

In this vehicle, the imaging device and the light emitting device are assembled side by side in the accommodating case, and the accommodating case is attached to the bumper portion of the vehicle. For this reason, attachment of the imaging device and the light emitting device to the bumper is facilitated.

CITATION LIST

Patent Literature

[Patent Literature 1]
Japanese Unexamined Patent Application, First Publication No. 2001-158284

SUMMARY OF INVENTION

Technical Problem

Incidentally, while a vehicle disclosed in Patent Literature 1 is a four-wheeled vehicle having a cabin, also in a saddle riding vehicle such as a motorcycle or the like, an object information acquisition device such as an imaging device or the like and a light emitting device may be suitably assembled to be integrated with the vehicle.

However, in a saddle riding vehicle such as a motorcycle or the like, a disposition space is restricted in comparison with a four-wheeled vehicle having a cabin, and when an object information acquisition device is simply disposed side by side with a light emitting device in an accommodating case provided in the vehicle, the accommodating case is increased in size, and thus, the entire vehicle is increased in size.

An aspect of the present invention is directed to providing a saddle riding vehicle in which an increase in size of the vehicle is able to be minimized by compactly disposing a light emitting device and an object information acquisition device in a common accommodating case.

Solution to Problem

A saddle riding vehicle according to the present invention employs the following configurations.

(1) A saddle riding vehicle according to an aspect of the present invention includes a light emitting device configured to radiate light to outside of the vehicle; an object information acquisition device configured to acquire information of an object outside the vehicle; a control board, to which the light emitting device is attached, configured to control the light emitting device; and an accommodating case configured to accommodate the light emitting device, the object information acquisition device, and the control board, wherein the object information acquisition device is supported by the control board.

In the saddle riding vehicle according to the present invention of (1), the object information acquisition device is disposed in the accommodating case while being supported by the control board of the light emitting device. Accordingly, since the object information acquisition device and the light emitting device are collectively disposed in the accommodating case, a decrease in size of the accommodating case and also a decrease in size of the entire vehicle become possible.

(2) In the aspect of (1), the light emitting device may be supported by one surface of the control board, and the object information acquisition device may be supported by the other surface of the control board.

In the case of (2), since the light emitting device and the object information acquisition device are supported by front and back surfaces of the control board, an area of the control board can be easily reduced. Accordingly, when this configuration is employed, the accommodating case can be further decreased in size.

(3) In the aspect of (1) or (2), the accommodating case may be a headlight case installed at a front section of the vehicle, and the light emitting device may be an LED that constitutes a light source of a headlight.

In the case of (3), since the object information acquisition device is disposed in the headlight case of the front section of the vehicle together with a small LED that is a light source of the headlight, the object information acquisition device can be disposed together with the light emitting device with flexibility.

(4) In the aspect of (3), the control board may be disposed substantially horizontally in the headlight case, the LED may be attached to a lower surface of the control board, a reflector configured to reflect and radiate light emitted from the LED toward a side in front of the vehicle may be disposed below the control board, and the object information acquisition device may be supported by an upper surface of the control board.

In the case of (4), since the LED is attached to the control board on a lower surface side disposed substantially horizontally in the headlight case and light emitted from the LED is reflected by the reflector disposed below the LED to be radiated toward a side in front of the vehicle, the LED cannot be easily seen from the outside, and an appearance thereof becomes good.

(5) In the aspect of (4), a front wall extending in an upward/downward direction may extend to be formed in front of the control board, and the front wall may have an opening section facing an information capturing section of the object information acquisition device.

In the case of (5), since a region of the object information acquisition device on a front side except the information capturing section is covered with the front wall, a portion of the object information acquisition device except the information capturing section cannot be easily seen from the outside. Accordingly, when this configuration is employed, an appearance thereof becomes good.

Advantageous Effects of Invention

According to an aspect of the present invention, since an object information acquisition device is disposed in an accommodating case while being supported by a control board of a light emitting device, an increase in size of a vehicle can be minimized by compactly disposing the light emitting device and the object information acquisition device in the common accommodating case.

DESCRIPTION OF EMBODIMENTS

Figure 1:
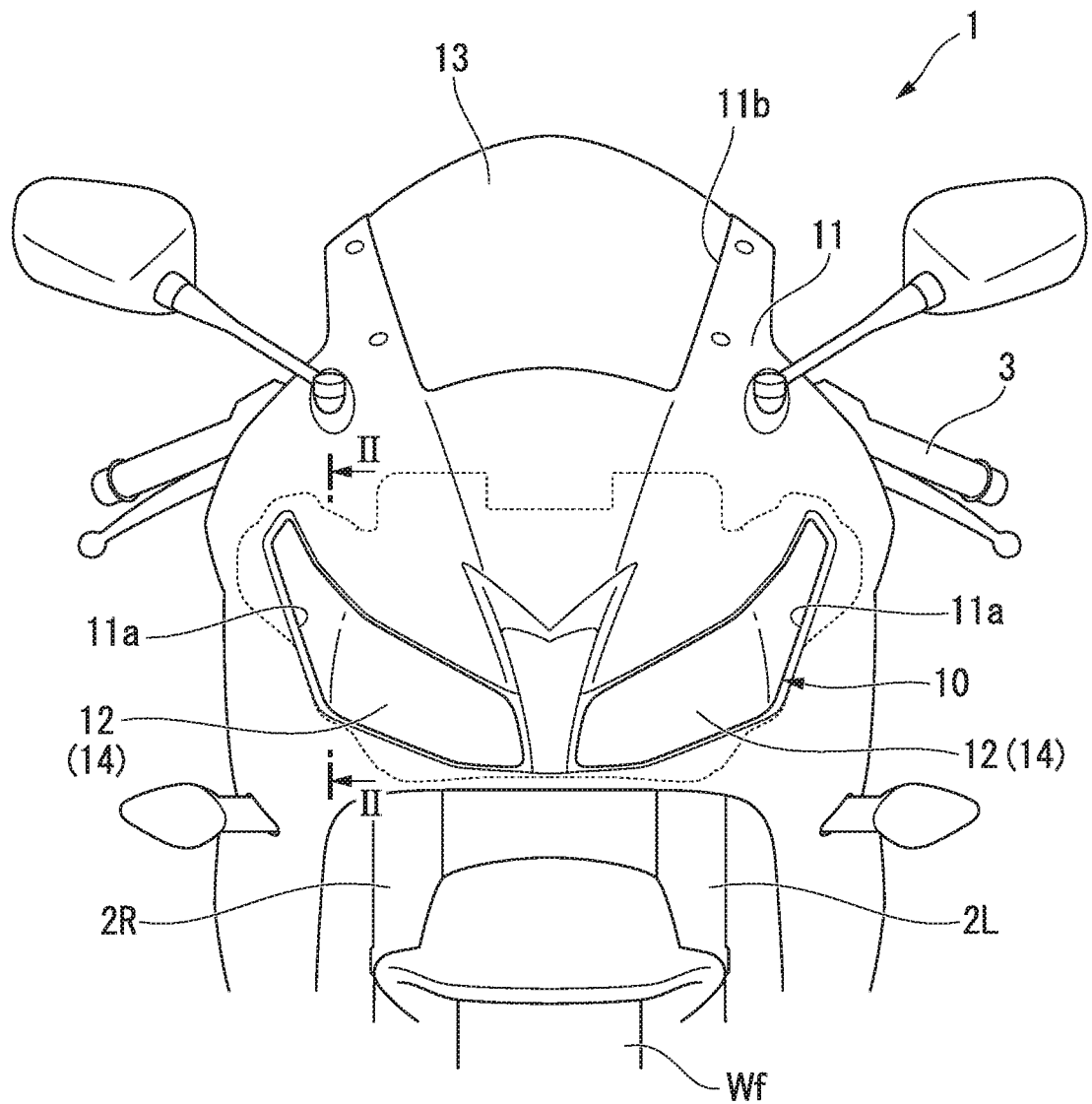
FIG. 1 is a front view of a saddle riding vehicle according to a first embodiment of the present invention.

Hereinafter, embodiments of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

First, a first embodiment shown in FIGS. 1 and 2 will be described.

FIG. 1 is a view showing a front surface (a front face) of a motorcycle 1 that is an aspect of a saddle riding vehicle.

In the motorcycle 1, a steering stem (not shown) is steerably supported by a head pipe (not shown) of a front section of a vehicle body frame, a pair of left and right front forks 2L and 2R are supported at a lower side of the steering stem, and a steering handle 3 is attached to an upper section of the steering stem. A front wheel Wf is rotatably supported by lower ends of the left and right front forks 2L and 2R, and an instrument panel (not shown), a headlight unit 10, or the like, is attached to upper sides of the left and right front forks 2L and 2R.

In addition, an upper cowl 11 configured to cover a front section of the vehicle is attached to upper front sides of the left and right front forks 2L and 2R via a stay (not shown). A pair of opening sections 11a configured to expose left and right outer lenses 12 of the headlight unit 10 to the outside and a concave cutout section 11b to which a transparent windscreen 13 is attached are formed in the upper cowl 11.

Figure 2:
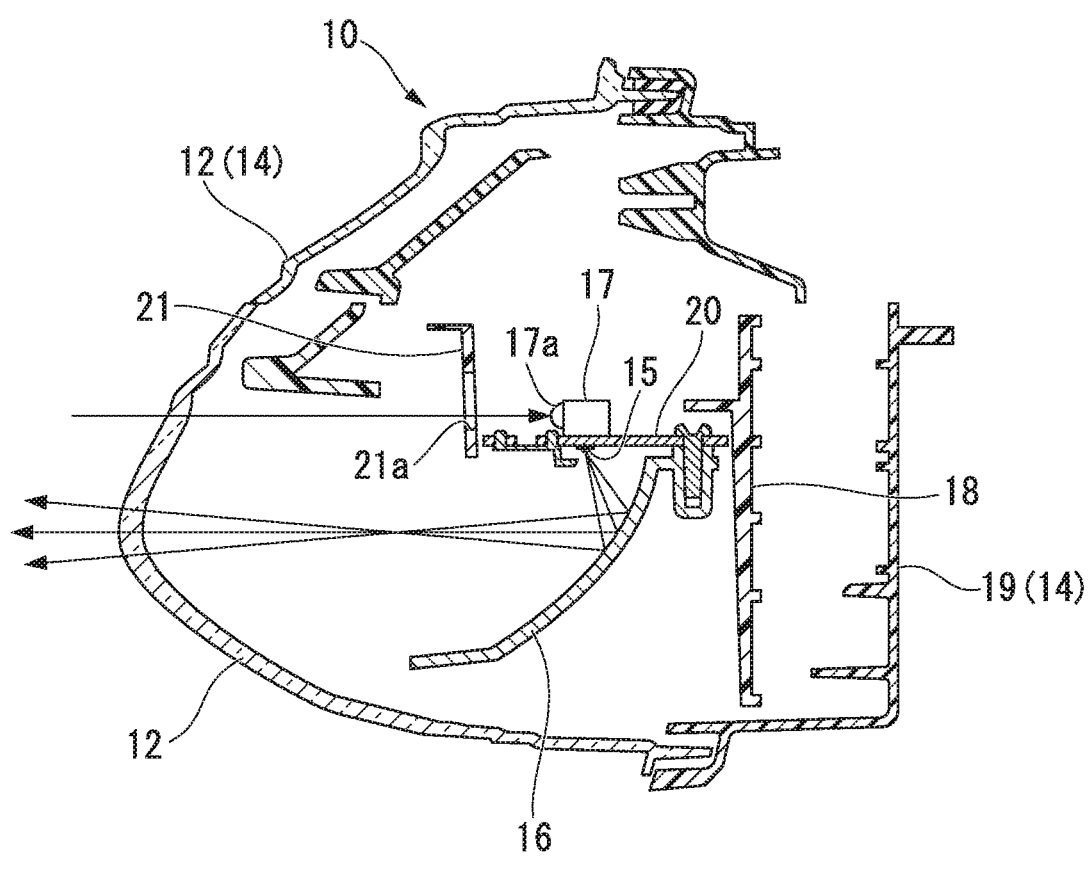
FIG. 2 is a cross-sectional view of the saddle riding vehicle according to the first embodiment of the present invention taken along line II-II in FIG. 1.
Figure 2:
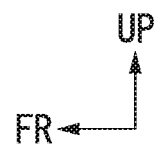

FIG. 2 is a view showing a cross section of the motorcycle 1 taken along line II-II in FIG. 1.

As shown in FIG. 2, the headlight unit 10 has an LED 15 that constitutes a light source of a headlight, a reflector 16 configured to reflect light radiated from the LED 15 toward a side in front of the vehicle, and an imaging device 17 using a CCD sensor, a MOS sensor, a CMOS sensor, or the like, which are disposed in a headlight case 14 that is an accommodating case. Data captured by the imaging device 17 are processed by, for example, a signal processing circuit (not shown), displayed on an on-vehicle monitor, and recorded on a recording medium, and after processing such as recognition of a preceding vehicle, a pedestrian, a road surface, a sign, or the like, from the captured image, then used for control or the like of various on-vehicle instruments.

In the embodiment, the LED 15 constitutes a light emitting device configured to radiate light outside of the vehicle, and the imaging device 17 constitutes an object information acquisition device configured to acquire information of an object outside the vehicle.

The headlight case 14 has a rear cover 19 opening forward and into which an installation base 18 of a part is attached, and the transparent outer lenses 12 fitted and fixed to an outer circumferential edge portion of the rear cover 19 and configured to cover a front side of the rear cover 19. A control board 20 on which a control circuit configured to control emission of the LED 15 is mounted is attached to the installation base 18. The control board 20 is formed in a substantially flat plate shape, and attached to the installation base 18, which is disposed substantially vertically, in a substantially horizontal posture.

The control board 20 has a lower surface (one surface) to which the LED 15 and the reflector 16 are attached, and an upper surface (the other surface) to which the imaging device 17 is attached. The imaging device 17 is disposed such that a lens section 17a that is an information capturing section is directed toward a side in front of the vehicle. In addition, a front wall 21 configured to cover an upper front portion of an installation section of the control board 20 in the headlight case 14 is fixed to the installation base 18. The front wall 21 extends in the upward/downward direction at a position in front of the installation section of the control board 20, and an opening section 21a into which an image of in front of the vehicle is taken from the lens section 17a is formed in a portion of the imaging device 17 facing the lens section 17a. Further, the opening section 21a is set to a size in which adjustment of an optical axis of the headlight is also taken into account.

In the motorcycle 1 according to the embodiment, in a state in which the imaging device 17 is supported by the control board 20 of the LED 15, the imaging device 17 is disposed in the headlight case 14 together with the LED 15.

For this reason, the LED 15 that is a light source of the headlight and the imaging device 17 can be compactly disposed in the common headlight case 14. Accordingly, in the motorcycle 1 according to the embodiment, an increase in size of the headlight case 14 can be avoided, and an increase in size of the vehicle can be minimized.

In particular, in the embodiment, the LED 15 that is the light emitting device is attached to the one surface (the lower surface) of the control board 20, and the imaging device 17 is attached to the other surface (the upper surface) of the control board 20. For this reason, since enlargement of an area of the control board 20 can be minimized and power can be supplied from the same board while the LED 15 and the imaging device 17 can be installed on the control board 20, a size of a harness or the like can be reduced. Accordingly, when the configuration is employed, the headlight case 14 can be further reduced in size.

In addition, in the case of the motorcycle 1 according to the embodiment, the imaging device 17 is accommodated in the headlight case 14 with relative spatial flexibility, and the light source of the headlight attached to the control board 20 is constituted by the LED 15 together with the imaging device 17. For this reason, the imaging device 17 can be mounted on the vehicle with sufficient flexibility together with the light emitting device (the LED 15).

Further, since the headlight case 14 is an accessory disposed at a position relatively close to a visual line of a driver above the front wheel Wf in the leftward/rightward direction, in the motorcycle 1 according to the embodiment, a side in front of the vehicle can be appropriately imaged by the imaging device 17.

In addition, in the motorcycle 1 according to the embodiment, the control board 20 is substantially horizontally disposed in the headlight case 14, the LED 15 and the reflector 16 are attached to the control board 20 on a lower surface side, and the imaging device 17 is attached to the control board 20 on an upper surface side.

For this reason, in the motorcycle 1 according to the embodiment, the LED 15 cannot be easily seen directly from the outside, and an appearance thereof becomes good.

Further, in the motorcycle 1 according to the embodiment, the front wall 21 extending in the upward/downward direction is provided to extend on a front section of the control board 20, and the opening section 21a facing the lens section 17a of the imaging device 17 is formed in the front wall 21. For this reason, in the motorcycle 1 according to the embodiment, a portion other than the lens section 17a of the imaging device 17 cannot be easily seen from the outside, and an appearance thereof becomes better.

Figure 3:
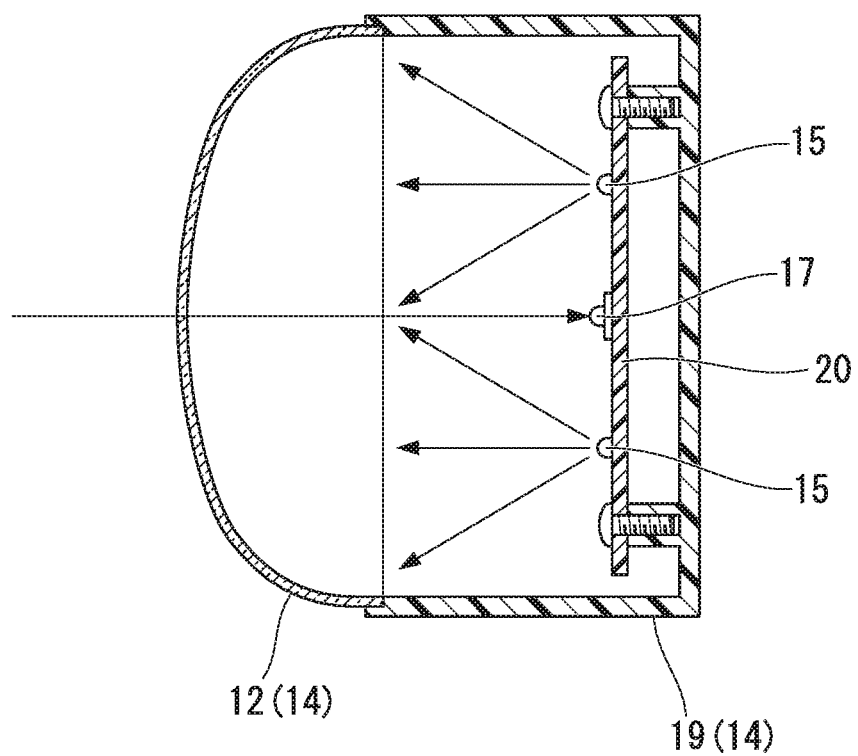
FIG. 3 is a longitudinal cross-sectional view of a headlight portion showing a variant of the saddle riding vehicle according to the first embodiment of the present invention.

Further, in the basic embodiment, while the reflector 16 configured to reflect light emitted from the LED 15 toward a side in front of the vehicle is disposed below the LED 15 that constitutes the light source of the headlight, like a variant in FIG. 3, light emitted from the LED 15 may be directly radiated forward without disposing the reflector below the LED 15. Further, in FIG. 3, components the same as those based on the embodiment disclosed in FIGS. 1 and 2 are designated by the same reference numerals.

Next, a second embodiment shown in FIGS. 4 to 7 will be described. Further, in FIGS. 4 to 7, components the same as those of the first embodiment are designated by the same reference numerals.

Figure 4:
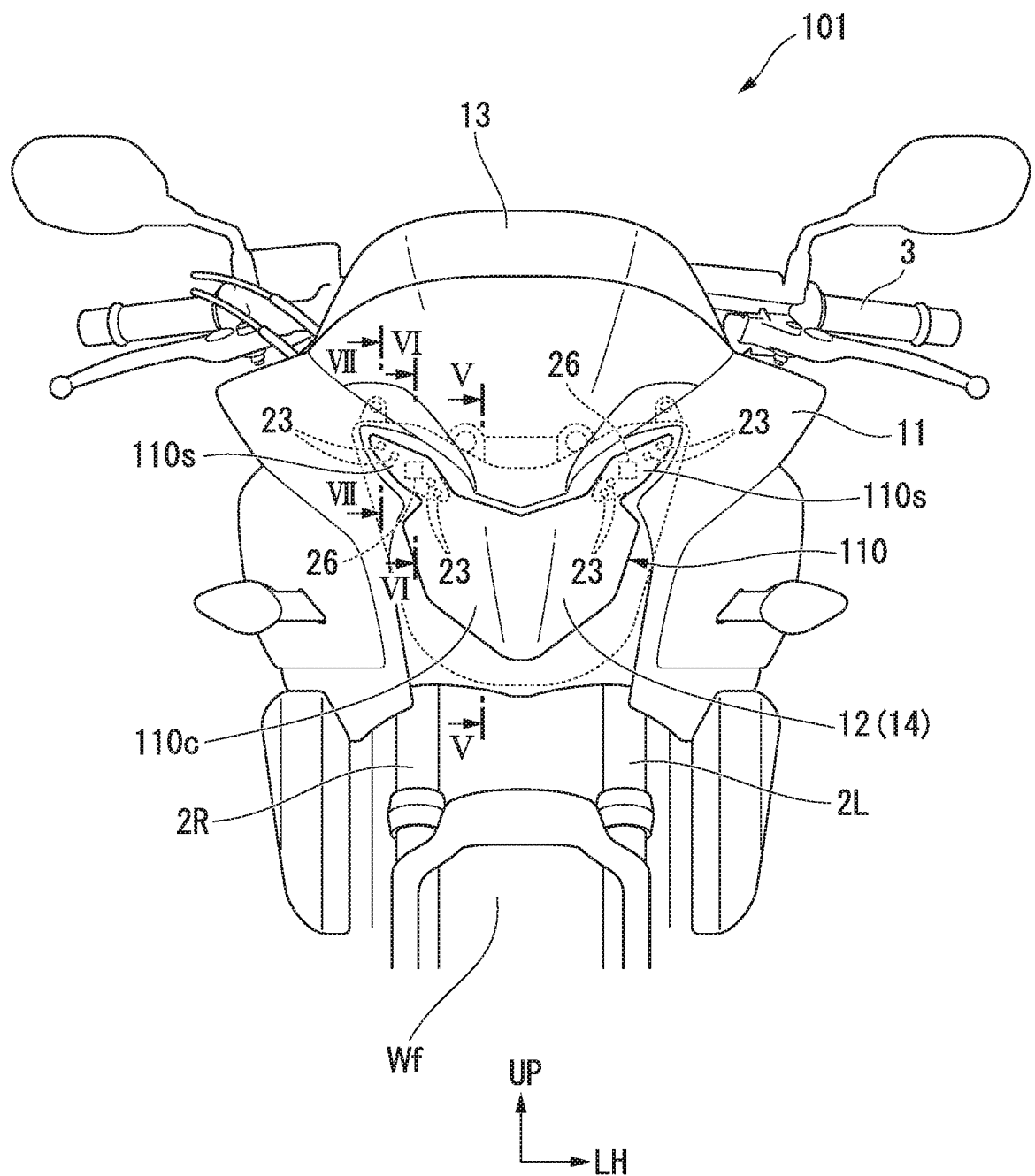
FIG. 4 is a front view of a saddle riding vehicle according to a second embodiment of the present invention.
Figure 5:
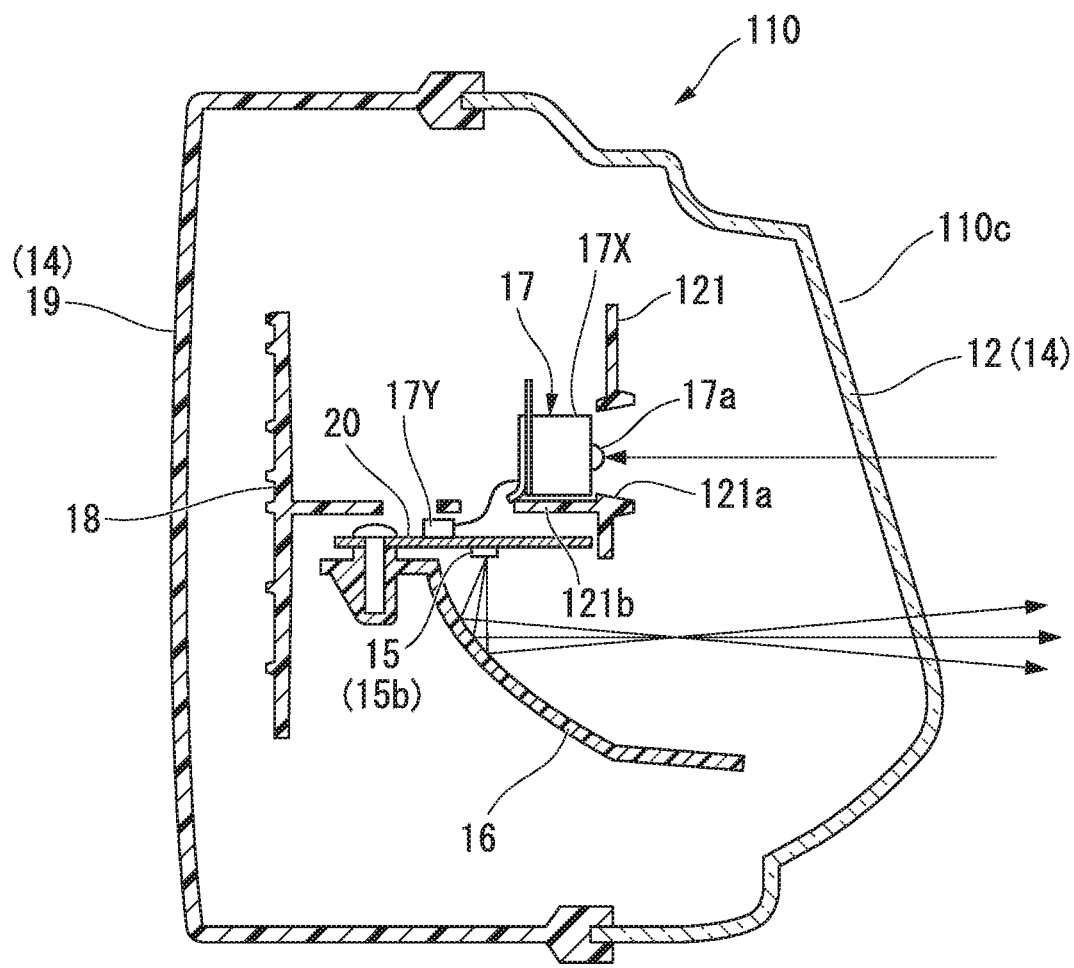
FIG. 5 is a cross-sectional view of the saddle riding vehicle according to the second embodiment of the present invention taken along line V-V in FIG. 4.
Figure 6:
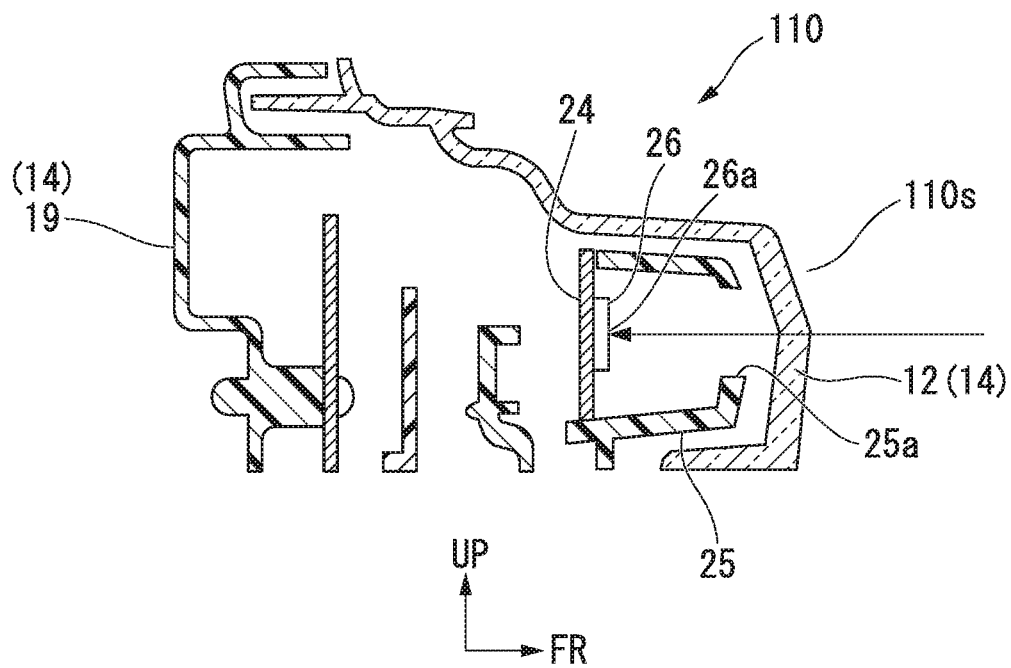
FIG. 6 is a cross-sectional view of the saddle riding vehicle according to the second embodiment of the present invention taken along line VI-VI in FIG. 4.
Figure 7:
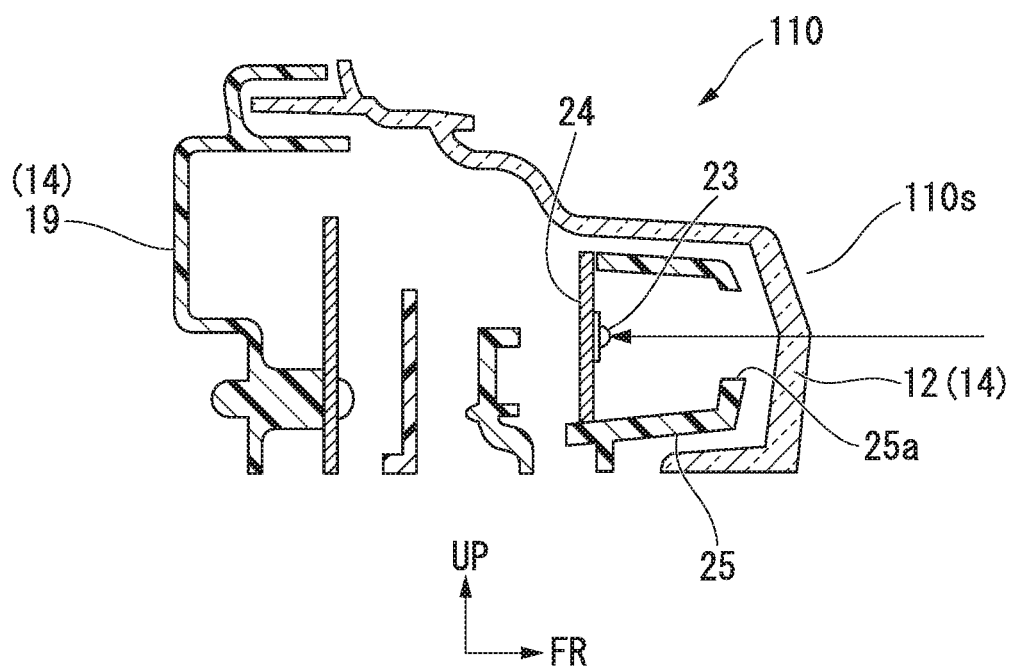
FIG. 7 is a cross-sectional view of the saddle riding vehicle according to the second embodiment of the present invention taken along line VII-VII in FIG. 4.

FIG. 4 is a front surface (a front face) of a motorcycle 101 that is an aspect of the saddle riding vehicle, and FIG. 5 is a view showing a cross section of the motorcycle 101 taken along line V-V in FIG. 4. In addition, FIG. 6 is a view showing a cross section of the motorcycle 101 taken along line VI-VI in FIG. 4, and FIG. 7 is a view showing a cross section of the motorcycle 101 taken along line VII-VII in FIG. 4.

As shown in FIG. 4, in the motorcycle 101, like the first embodiment, a headlight unit 110 is attached to upper sides of the left and right front forks 2L and 2R, and surroundings of the outer lenses 12 of the headlight unit 110 are covered with the upper cowl 11 that covers the front section of the vehicle.

In the headlight unit 110, a central region when seen in a front view becomes a headlight mounting section 110c, and regions extending from left and right upper edge portions of the headlight mounting section 110c diagonally upward and outward become width indicator light mounting sections 110s.

As shown in FIG. 5, the headlight unit 110 is configured such that the headlight case 14 functions as the accommodating case and the outer lenses 12 are attached to the front section of the rear cover 19. The control board 20 of the LED 15 (the light emitting device) for the headlight is attached to the installation base 18 attached to the rear cover 19. The control board 20 is disposed on the headlight mounting section 110c in the headlight case 14 in a substantially horizontal posture. The LED 15 that constitutes the light source of the headlight and the reflector 16 configured to reflect light radiated from the LED 15 toward a side in front of the vehicle are attached to the lower surface (the one surface) of the control board 20.

In addition, a front wall 121 extending in the upward/downward direction and configured to cover an upper front section of the control board 20 is supported by the front edge portion of the control board 20. The front wall 121 includes an opening section 121a, and a shelf section 121b extending from an inner side of a lower edge of the opening section 121a toward a rear side. A main body section 17X of the imaging device 17 using a CCD sensor, a MOS sensor, a CMOS sensor, or the like, is attached to the shelf section 121b. The lens section 17a that is the information capturing section of the imaging device 17 faces the opening section 121a. The main body section 17X of the imaging device 17 is connected to a wiring on the control board 20 on a part of the imaging device 17 via a connector section 17Y that is a power supply section. That is, in the embodiment, while the main body section 17X of the imaging device 17 is not directly attached to the control board 20, since the connector section 17Y that is a part of the imaging device 17 is assembled on the control board 20, also in the embodiment, the imaging device 17 that is the object acquisition device is supported by the control board 20.

As shown in FIGS. 6 and 7, a lamp body housing 25 configured to hold a control board 24 of LEDs 23 (light emitting devices) for width indicators is installed on the left and right width indicator mounting sections 110s of the headlight unit 110. The lamp body housing 25 is disposed behind the outer lenses 12, and opening sections 25a configured to radiate light are formed at positions facing the outer lenses 12. The control board 24 is disposed in a substantially vertical direction such that a substantially flat surface is directed toward a side in front of the vehicle. A plurality of LEDs 23 (see FIG. 7) functioning as the light sources for width indicators are attached to a front surface of the control board 24.

In addition, an imaging device 26 using a CCD sensor, a MOS sensor, a CMOS sensor, or the like, is attached to a substantially central region in a front surface of the control board 24 in an arrangement direction of the LEDs 23 to be adjacent to the LEDs 23. A lens section 26a that is an information capturing section of the imaging device 26 faces the opening section 25a of the lamp body housing 25.

In the motorcycle 101 according to the embodiment, in a state in which the imaging device 17 of the headlight mounting section 110c is supported by the control board 20 of the LED 15 for a headlight, the imaging device 17 is disposed in the headlight case 14 together with the LED 15. Accordingly, also in the embodiment, an increase in size of the headlight case 14 can be avoided, and an increase in size of the vehicle can be minimized.

In the embodiment, since the imaging device 17 of the headlight mounting section 110c and the LED 15 for a headlight are supported by the control board 20 in substantially the same manner as the first embodiment, the same effects as in the first embodiment can be obtained.

Further, in the motorcycle 101 according to the embodiment, the imaging devices 26 are also provided in the width indicator mounting sections 110s, the imaging devices 26 are attached to the control board 24 of the LEDs 23 for width indicators together with the LEDs 23 for width indicators, and these are disposed in the headlight case 14. For this reason, regarding the structure of the width indicator mounting section 110s, it is also possible to avoid an increase in size of the headlight case 14 and minimize an increase in size of the vehicle.

Further, the present invention is not limited to the above-mentioned embodiments and various design changes may be made without departing from the scope of the present invention. For example, in the above-mentioned embodiments, while the imaging device is used as the object information acquisition device configured to acquire information of an object outside the vehicle, the object information acquisition device is not limited to the imaging device and an apparatus such as an ultrasonic sensor, an infrared sensor, or the like, may be provided as long as the apparatus can acquire information of an object.

In addition, the saddle riding vehicle according to the present invention is not limited to a motorcycle (including a motorized bicycle and a scooter-type vehicle) and also include a three-wheeled vehicle such as a one-front-wheeled and two-rear-wheeled vehicle, or the like.

Reference Signs List 1, 101 Motorcycle (saddle riding vehicle)
14 Headlight case (accommodating case)
15, 23 LED (light emitting device)
16 Reflector
17, 26 Imaging device (object information acquisition device)
17a Lens section (information capturing section)
20, 24 Control board
21, 121 Front wall
21a, 121a Opening section

The invention claimed is:

1. A saddle riding vehicle comprising:
   a light emitting device configured to radiate light to outside of the vehicle;
   an object information acquisition device configured to acquire information of an object outside the vehicle;
   a control board, to which the light emitting device is attached, configured to control the light emitting device; and
   an accommodating case configured to accommodate the light emitting device, the object information acquisition device, and the control board,
   wherein the light emitting device is supported by one surface of the control board, and the object information acquisition device is supported by an opposite surface of the control board.

2. The saddle riding vehicle according to claim 1, wherein the accommodating case is a headlight case installed at a front section of the vehicle, and
   the light emitting device is an LED that constitutes a light source of a headlight.

3. A saddle riding vehicle comprising:
   a light emitting device configured to radiate light to outside of the vehicle;
   an object information acquisition device configured to acquire information of an object outside the vehicle;
   a control board, to which the light emitting device is attached, configured to control the light emitting device; and
   an accommodating case configured to accommodate the light emitting device, the object information acquisition device, and the control board,
   wherein the object information acquisition device is supported by the control board,
   the accommodating case is a headlight case installed at a front section of the vehicle, and
   the light emitting device is an LED that constitutes a light source of a headlight,
   the control board is disposed substantially horizontally in the headlight case,
   the LED is attached to a lower surface of the control board,
   a reflector configured to reflect and radiate light emitted from the LED toward a side in front of the vehicle is disposed below the control board, and
   the object information acquisition device is supported by an upper surface of the control board.

4. The saddle riding vehicle according to claim 3, wherein a front wall extending in an upward/downward direction extends to be formed in front of the control board, and
   the front wall has an opening section facing an information capturing section of the object information acquisition device.

* * * * *